(12) United States Patent
Oshetski et al.

(10) Patent No.: US 10,465,658 B2
(45) Date of Patent: Nov. 5, 2019

(54) OPTICAL CONDITION MONITORING SYSTEM FOR A WIND TURBINE GENERATOR AND METHODS OF USE THEREOF

(71) Applicant: MICATU INC., Horseheads, NY (US)

(72) Inventors: Michael Oshetski, Horseheads, NY (US); Atul Pradhan, Pittsford, NY (US)

(73) Assignee: Micatu Inc., Horseheads, NY (US)

( * ) Notice: Subject to any disclaimer, the term of this patent is extended or adjusted under 35 U.S.C. 154(b) by 0 days.

(21) Appl. No.: 15/760,044

(22) PCT Filed: Sep. 15, 2016

(86) PCT No.: PCT/US2016/051851
§ 371 (c)(1),
(2) Date: Mar. 14, 2018

(87) PCT Pub. No.: WO2017/048903
PCT Pub. Date: Mar. 23, 2017

(65) Prior Publication Data
US 2019/0048854 A1    Feb. 14, 2019

Related U.S. Application Data

(60) Provisional application No. 62/218,622, filed on Sep. 15, 2015.

(51) Int. Cl.
*F01D 5/02* (2006.01)
*F03D 7/04* (2006.01)
(Continued)

(52) U.S. Cl.
CPC .............. *F03D 7/043* (2013.01); *F01D 5/00* (2013.01); *F01D 5/02* (2013.01); *F03D 7/0224* (2013.01);
(Continued)

(58) Field of Classification Search
CPC .. G01H 9/00; G01R 31/027; H01F 2027/404; H02H 7/04; F03D 7/00; F03D 17/00; F05B 2270/804
See application file for complete search history.

(56) References Cited

U.S. PATENT DOCUMENTS 6,320,272 B1    11/2001  Lading et al.
8,849,587 B1     9/2014  Lightle et al.
(Continued)

OTHER PUBLICATIONS

International Search Report and Written Opinion for corresponding Application No. PCT/US2016/051851 (dated Dec. 7, 2016).

*Primary Examiner* — Maurice C Smith
(74) *Attorney, Agent, or Firm* — Pepper Hamilton LLP

(57) ABSTRACT

A wind turbine condition monitoring system includes a light source configured to produce an emitted light beam and a plurality of optical sensors configured to be positioned on a wind turbine to receive the emitted light beam from the light source. The optical sensors are configured to generate one or more product light beams from the emitted light beam. A detector is positioned to receive the product light beams generated from the optical sensors and is configured to measure intensity values of the product light beams for the optical sensors. A computing device is coupled to the detector and includes a processor and a memory coupled to the processor. The processor executes programmed instructions stored in the memory to determine, based on the intensity values for the product light beams for the optical sensors, at least a displacement value, a current value, and a voltage value for the wind turbine.

29 Claims, 8 Drawing Sheets

(51) Int. Cl.
*F01D 5/00* (2006.01)
*F03D 17/00* (2016.01)
*F03D 7/02* (2006.01)
*G01H 1/00* (2006.01)

(52) U.S. Cl.
CPC ............ *F03D 17/00* (2016.05); *G01H 1/003* (2013.01); *F05B 2270/334* (2013.01); *F05B 2270/804* (2013.01)

(56) References Cited

U.S. PATENT DOCUMENTS

| | | |
|---|---|---|
| 2009/0162186 A1 | 6/2009 | Christinsen et al. |
| 2011/0133474 A1 | 6/2011 | Haar |
| 2012/0045330 A1* | 2/2012 | Wu ........................ F03D 7/042 416/1 |
| 2013/0078095 A1* | 3/2013 | Olesen ................... F03D 7/022 416/61 |
| 2013/0214535 A1 | 8/2013 | Brath |
| 2014/0023498 A1 | 1/2014 | Kominsky |
| 2014/0054476 A1* | 2/2014 | Zheng .................... F03D 17/00 250/578.1 |
| 2015/0010399 A1* | 1/2015 | Bahat ..................... A01M 29/08 416/1 |
| 2016/0084233 A1* | 3/2016 | Evans .................... F03D 17/00 73/112.01 |

* cited by examiner

OPTICAL CONDITION MONITORING SYSTEM FOR A WIND TURBINE GENERATOR AND METHODS OF USE THEREOF

This application is a national stage application under 35 U.S.C. § 371 of PCT Application No. PCT/US2016/051851, filed Sep. 15, 2016, which claims the benefit of U.S. Provisional Patent Application Ser. No. 62/218,622, filed Sept. 15, 2015, which is hereby incorporated by reference in its entirety.

FIELD OF THE INVENTION

The present invention relates to an optical condition monitoring system for a wind turbine generator and methods of use thereof.

BACKGROUND OF THE INVENTION

At least some known wind turbine generators include a rotor having multiple blades. The rotor is sometimes coupled to a housing, or nacelle, that is positioned on top of a base, for example, a truss or tubular tower. At least some known utility grade wind turbines (i.e., wind turbines designed to provide electrical power to a utility grid) have rotor blades having predetermined shapes and dimensions. The rotor blades transform mechanical wind energy into induced blade lift forces that further induce a mechanical rotational torque that drives one or more generators via a drive train that includes a rotor shaft, subsequently generating electric power. The generators are sometimes, but not always, rotationally coupled to the rotor shaft through a gearbox. The gearbox steps up the inherently low rotational speed of the rotor shaft for the generator to efficiently convert the rotational mechanical energy to electrical energy, which is fed into the electric utility grid. Gearless direct drive wind turbine generators also exist.

During operation of such known wind turbine generators, the rotor may experience a mass imbalance, thereby inducing increased loads on the rotor and other drive train components. Also, the rotor's position with respect to the wind may induce increased loads on the rotor and other drive train components. The associated gear boxes and drive train components may also experience failures. Failures of such known wind turbines may also include drive systems, control gears, transmissions, bearings, drive shaft imbalances, and mounting bushings. Environmental stresses and mechanical failures over the operation of the turbine generators results in changes and shifts to the vibrational frequencies and angular velocity fundamental signals which are indicative of a developing fault.

One commonly employed technique is to examine the individual frequencies present in the signal. These frequencies correspond to certain mechanical components (for example, the various pieces that make up a known wind turbine generators rolling-element bearing) or certain malfunctions (such as shaft imbalance or misalignment). By examining these frequencies and their harmonics, analysis can often identify the location and type of problem, and sometimes the root cause as well. For example, high vibration at the frequency corresponding to the speed of rotation is most often due to residual imbalance and is corrected by balancing the drive shaft. As another example, a degrading rolling-element bearing will usually exhibit increasing vibration signals at specific frequencies as it wears. A condition monitoring system can provide an analysis that is able to detect this wear weeks or even months before failure, giving ample warning to schedule replacement before a failure which could cause a much longer down-time.

Another commonly employed technique is to measure the voltage and current output of a constant-speed wind turbine generator to ensure power output. Additionally, variable-speed wind turbines can (very briefly) produce more power than the current wind conditions can support which causes additional strain on the power transformers of the wind turbine generator.

The present invention is directed to overcoming these and other deficiencies in the art.

SUMMARY OF THE INVENTION

One aspect of the present invention relates to a wind turbine condition monitoring system including a light source configured to produce an emitted light beam. A plurality of optical sensors are configured to be positioned at a plurality of separate locations on a wind turbine and to receive the emitted light beam from the light source. Each of the plurality of optical sensors is configured to generate one or more product light beams from the emitted light beam. The plurality of optical sensors includes at least one vibration sensor, at least one voltage sensor, and at least one current sensor. A detector is positioned to receive the one or more product light beams generated from each of the plurality of optical sensors. The detector is configured to measure intensity values of the one or more product light beams for each of the plurality of optical sensors. A computing device is coupled to the detector and includes a processor and a memory coupled to the processor. The processor executes programmed instructions stored in the memory to determine, based on the measured intensity values for the one or more product light beams for each of the plurality of optical sensors, at least a displacement value, a current value, and a voltage value for the wind turbine.

Another aspect of invention relates to a wind turbine including the wind turbine condition monitoring system according to the present invention. The plurality of optical sensors are positioned at a plurality of separate locations on the wind turbine.

A further aspect of the present invention relates to a method for monitoring a condition of a wind turbine. The method involves providing the wind turbine condition monitoring system according to the present invention. The plurality of optical sensors are coupled to the wind turbine. The intensity values are measured for the one or more product light beams for each of the plurality of optical sensors over a period of time. At least a displacement value, a current value, and a voltage value for the wind turbine generator or transformer therein are determined over the period of time based on the measured intensity values for the one or more product light beams for each of the plurality of optical sensors. The determined displacement value, the determined current value, and the determined voltage value are monitored for changes over the period of time to monitor the condition of the wind turbine generator or transformer therein.

Another aspect of the present invention relates to a method for operating a wind turbine generator. The method includes generating at least one of a plurality of angular displacement values, a plurality of angular velocity values, a plurality of magnitude values, a plurality of vibrational frequency values, a plurality of voltage values, a plurality of current values and a plurality of optical intensity signals. The method also includes determining voltage, current and power output of said wind turbine generator. The method further includes modulating at least one of the properties of a wind turbine including but not limited to generator yaw orientation, nacelle orientation, power generation, blade speed and a blade pitch orientation as a function of the determined plurality of measurement values.

A further aspect of the present invention relates to a wind turbine generator condition monitoring system. The system includes a plurality of optical angular velocity, acceleration, frequency, voltage and current measurement sensors. The system also includes at least one processor coupled to the plurality of sensors. The at least one processor is programmed to determine a difference between each of the plurality of sensors of at least one of an angular displacement, an angular velocity, an angular acceleration, a vibrational frequency, a magnitude, a voltage, and a current of the wind turbine generator systems. An output of the at least one processor includes at least one of a wind turbine generator frequency, voltage and or current measurement signal. The at least one processor provides said measurements to an external central monitoring station or additional processing unit for external monitoring of said wind turbine generator.

Still another aspect of the present invention relates to a wind turbine generator control system. The wind turbine generator includes a rotor shaft and an optical condition monitoring system. The condition monitoring system includes a plurality of optical sensors. The system also includes at least one processor coupled to the plurality of sensors. The at least one processor is programmed to determine a difference between each of the plurality of sensors of at least one of an angular displacement, an angular velocity, an frequency, an voltage, an current and an angular acceleration of the wind turbine systems. The system interface to the wind turbine generators control system for the optimization of power production and the reduction of wear on the wind turbine generator.

The systems and methods of the present invention provide a number of advantages including facilitating operation of wind turbine generators by measuring the current operational state of said wind turbine generator. Such conduction measurements provide indications of increased stresses on the wind turbine generator systems that may be reduced by changes in current operational state of the wind turbine generator, i.e. control surfaces, generator output and rotating components. Reducing such stresses facilitates extending operational life expectancies of wind turbine generators. The said invention combines optical sensor technologies into a complete method of measuring vibration, a method of measuring voltage, and a method of measuring current of a wind turbine using the system. Thus, the invention provides a non-electrical sensor monitoring system that allows for the sensors and the active components to be located remotely from one another allowing positioning of the sensors at various locations on a wind turbine.

DETAILED DESCRIPTION

The present invention relates to an optical sensor system and methods of use thereof. More specifically, the present invention relates to an optical condition monitoring system for a wind turbine generator and methods of use thereof.

One aspect of the present invention relates to a wind turbine condition monitoring system including a light source configured to produce an emitted light beam. A plurality of optical sensors are configured to be positioned at a plurality of separate locations on a wind turbine and to receive the emitted light beam from the light source. Each of the plurality of optical sensors is configured to generate one or more product light beams from the emitted light beam. The plurality of optical sensors includes at least one vibration sensor, at least one voltage sensor, and at least one current sensor. A detector is positioned to receive the one or more product light beams generated from each of the plurality of optical sensors. The detector is configured to measure intensity values of the one or more product light beams for each of the plurality of optical sensors. A computing device is coupled to the detector and includes a processor and a memory coupled to the processor. The processor executes programmed instructions stored in the memory to determine, based on the measured intensity values for the one or more product light beams for each of the plurality of optical sensors, at least a displacement value, a current value, and a voltage value for the wind turbine.

Figure 1:
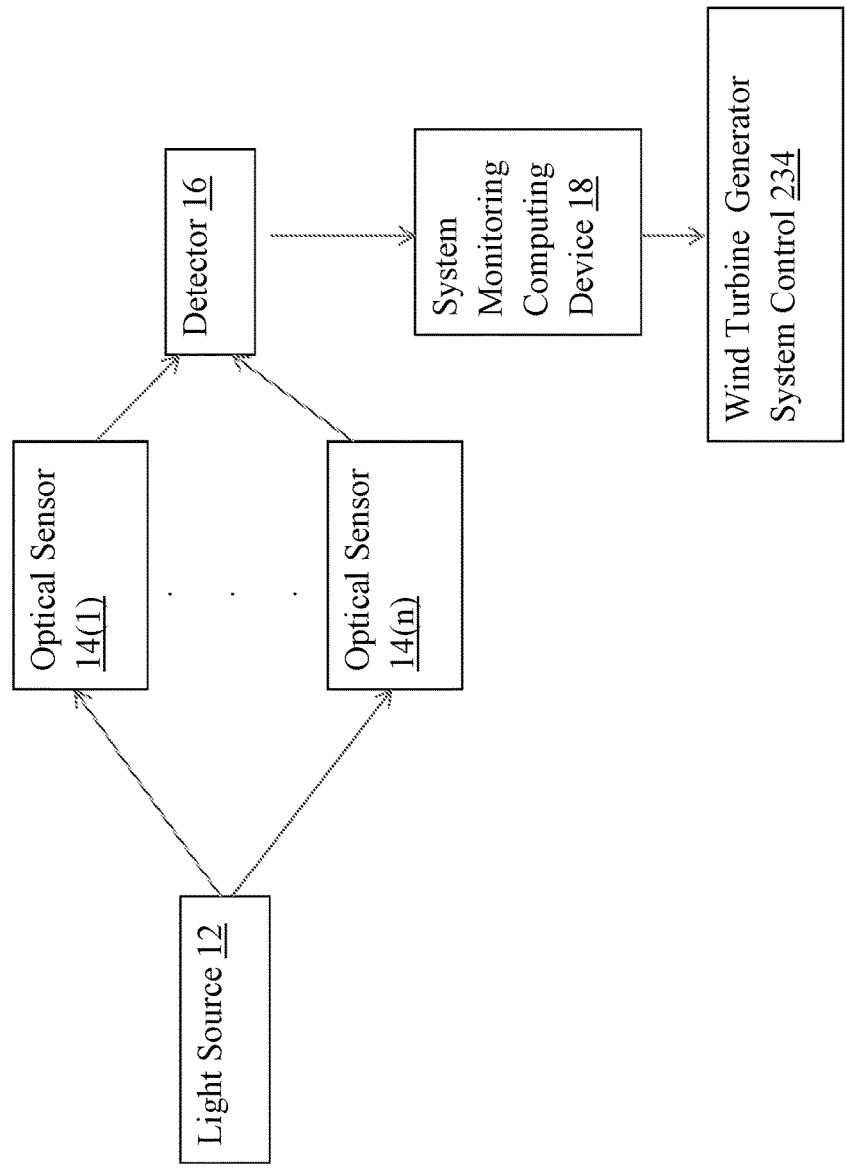
FIG. 1 is a block diagram of an embodiment of a wind turbine condition monitoring system of the present invention.

FIG. 1 is a block diagram of an embodiment of a wind turbine condition monitoring system 10 of the present invention. System 10 includes a light source 12, a plurality of optical sensors 14(1)-14(2), a detector 16, and a system monitoring computing device 18. System 10 may also include other types and numbers of elements, components, or devices in other configurations, including additional optics, such as lenses, prisms, collimators, or filters, or electronics, such as amplifiers, AC to DC converters, or transducers, by way of example only. Additional optics may be utilized, by way of example, to redirect, focus, collimate, or filter the wavelength of light with the system. Additional electronics may be utilized, by way of example, to condition the signal from detector 16 to facilitate further processing.

Light source 12, according to one embodiment, may be any suitable laser diode that produces and emits a temporally or spatially coherent, or partially coherent, light beam, such as a He Ne gas laser operating at a wavelength of approximately 632 nm. Alternatively, other laser diodes, operating at other wavelengths, such as 1310 or 1550 lasers, may be utilized. In another embodiment, light source 12 may be a non-coherent source, such as a light emitting diode or superluminescent diode, by way of example only, coupled with optics or filters to spectrally narrow the linewidth or spatially filter the emitted light beam.

Plurality of optical sensors 14(1)-14(n) are configured to be positioned at a plurality of separate locations on a wind turbine, as described in further detail below. Plurality of optical sensors 14(1)-14(n) are positioned to receive an emitted light beam from light source 12. According to one embodiment, light source 12 is coupled to the plurality of optical sensors 14(1)-14(n) through optical fibers, such as a single mode optical fiber, although multi-mode fibers may be utilized, that deliver light emitted from light source 12 to optical sensors 14(1)-14(n). The use of optical fibers coupled to light source 12 to transfer the emitted beam to plurality of optical sensors 14(1)-14(n) allows light source 12 to be located remotely from plurality of optical sensors 14(1)-14(n).

Plurality of optical sensors 14(1)-14(n) include displacement and vibration sensors, such as a vibration sensor including an etalon positioned to receive the emitted light beam from light source 12 as described in PCT Application PCT/US2015/15763, the disclosure of which is hereby incorporated herein by reference in its entirety. In one example, the etalon is mounted to a support structure at one or more pivot points such that displacement or vibration is measured based on a change in position of the etalon relative to the one or more pivot points. In one example, a vibration sensor is configured and positioned to detect vibrations due to magnetostriction within a wind turbine. Plurality of optical sensors 14(1)-14(n) may also include optical voltage and current sensors as described, by way of example only, in U.S. Pat. Nos. 5,731,579, 5,892,357, 5,939,711, 6,124,706, 6,307,666, 6,362,615, 6,388,434, 6,621,258 and 6,492,800, the disclosures of which are hereby incorporated herein by reference in their entirety. Plurality of optical sensors 14(1)-14(n) are configured to generate one or more product light beams from the emitted light beam from light source 12.

Detector 16 is positioned to receive product light beams generated from plurality of optical sensors 14(1)-14(n). In one example, detector 16 measures intensity values for the product light beams. According to one embodiment, detector 16 is a silicon photodiode. Other types and numbers of photodetectors, such as an InGaAs detector, HgTe detector, photomultipliers, CCD, or CMOS detectors may be utilized. Detector 16 has a fast response time in order to receive and detect intensity values for the modulated light emitted from plurality of optical sensors 14(1)-14(n). Detector 16 may be any suitable photodetector and may be selected based on the application, i.e., the wavelength of light to be detected.

Detector 16 may be coupled to one or more optical fibers, such as a single mode optical fiber, although multimode optical fibers may be utilized, such that the optical fibers collect light from plurality of optical sensors 14(1)-14(n) and transmit the light to detector 16. The use of an optical fiber coupled to detector 16 allows detector 16 to be located remotely from plurality of optical sensors 14(1)-14(n).

Figure 2:
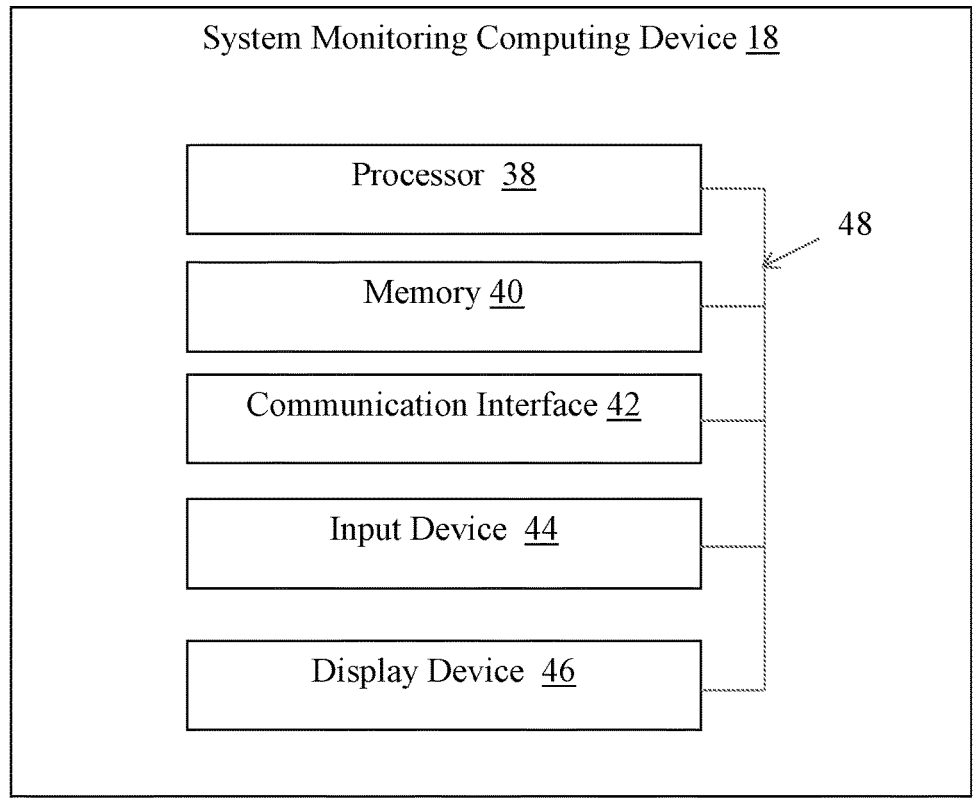
FIG. 2 is a block diagram of an exemplary system monitoring computing device for use in the wind turbine condition monitoring system illustrated in FIG. 1.

Detector 16 is coupled to system monitoring computing device 18. Additional electronics may be utilized, such as amplifiers, transducers, or converters, by way of example, to condition the signal from detector 16 to facilitate further processing. Referring now more specifically to FIG. 2, system monitoring computing device 18 is configured to determine at least a displacement value, a current value, and a voltage value from information received from detector 16 based on the measured intensity values for the product light beams received from plurality of optical sensors 14(1)-14(n) in accordance with the methods described herein.

System monitoring computing device 18 includes processor 38, memory 40, communication interface 42, input device 44, and display device 46, which are coupled together by bus 48 or other communication link, although other numbers and types of systems, devices, components, and elements in other configurations and locations can be used.

Processor 38 executes a program of instructions stored in memory 40 for one or more aspects of the present technology. Other numbers and types of systems, devices, components, and elements in other configurations and locations can be used to execute the program of instructions stored in memory 40.

Memory 40 stores these programmed instructions for one or more aspects of the present technology, although some or all of the programmed instructions could be stored and/or executed elsewhere. A variety of different types of memory storage devices, such as a random access memory (RAM), read only memory (ROM), hard disk, CD ROM, DVD ROM, or other computer readable medium which is read from and written to by a magnetic, optical, or other reading and writing system that is coupled to processor 38, can be used for memory 40.

Communication interface 42 is used to operatively couple and communicate between system monitoring computing device 18 and one or more other computing devices via a communications network. Other types and numbers of communication networks or systems with other types and numbers of connections and configurations can be used for communication between system monitoring computing device 18 and one or more other computing devices. By way of example only, the communications network could use TCP/IP over Ethernet and industry-standard protocols, including NFS, CIFS, SOAP, XML, LDAP, and SNMP. Other types and numbers of communication networks, such as a direct connection, a local area network, a wide area network, modems and phone lines, e-mail, and wireless communication technology, each having their own communications protocols, can be used by the communication networks.

The input device 44 and display device 46 of system monitoring computing device 18 enable a user to interact with system monitoring computing device 18, such as to input and/or view data and/or to configure, program, and/or operate system monitoring computing device 18, by way of example only. Input device 44 may include a keyboard, computer mouse, and/or touch screen, and display device 46 may include a computer monitor. Other types and numbers of input devices and/or display devices could also be used in other examples.

Another aspect of invention relates to a wind turbine including the wind turbine condition monitoring system according to the present invention. The plurality of optical sensors are positioned at a plurality of separate locations on the wind turbine. Another aspect of the present invention relates to embedding wind turbine condition monitoring system into the components of a wind power generator. In one example, an optical sensor is permanently placed in-between the materials that comprise the components of the wind turbine generator. An exemplary embodiment would place sensors between the fiber-glass layers of the wind turbine blades, nacelle body, rotor-hub, and/or tower parts, as described further below. In another embodiment, optical sensors can be placed in the electrical bushings and insulators for the direct measurement of mechanical and electrical properties of said wind turbine generator. A plurality of optical sensor providing different measurements can be embedded in the structure and systems of the wind turbine generator which connect optically to the light source and detector and processor.

Figure 3:
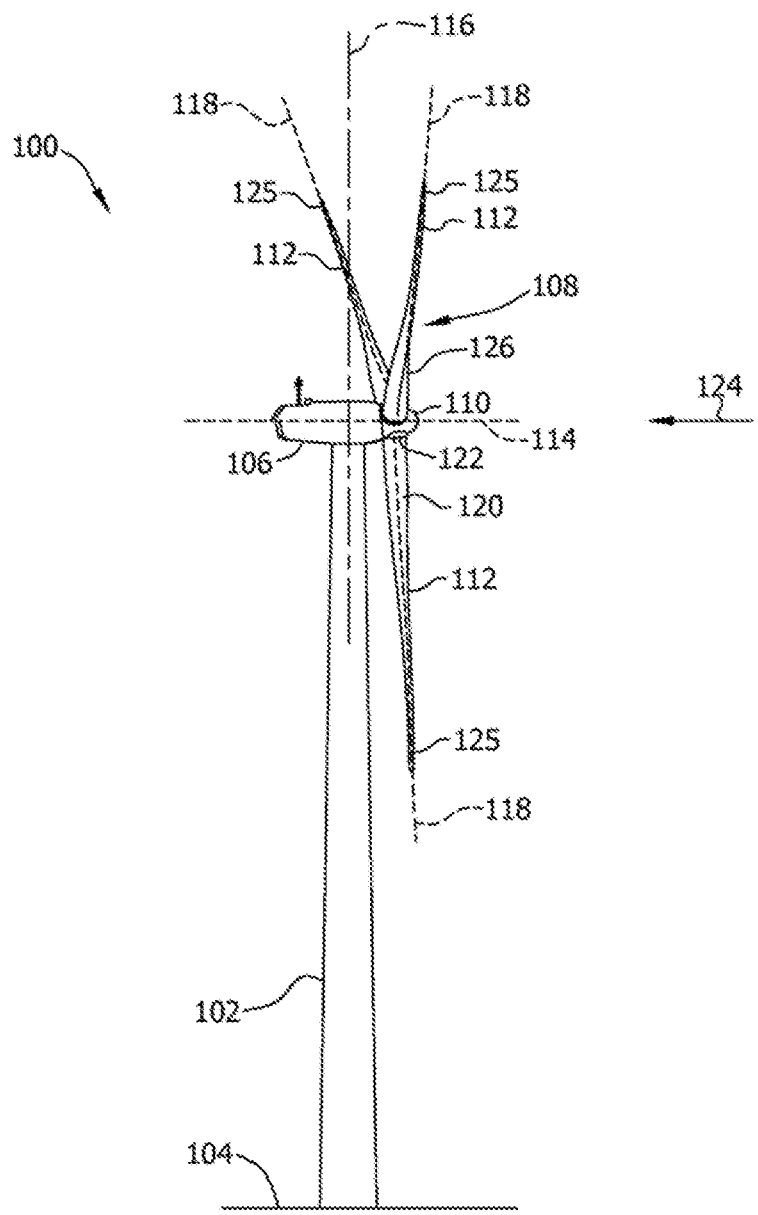
FIG. 3 is a schematic view of an exemplary wind turbine generator.

FIG. 3 is a schematic view of an exemplary wind turbine 100 in which plurality of optical sensors 14(1)-14(n) of the exemplary wind turbine condition monitoring system 10 may be embedded, as described below. In one example, wind turbine 100 is a horizontal axis wind turbine. Alternatively, wind turbine 100 may be a vertical axis wind turbine. Wind turbine 100 has a tower 102 extending from a supporting surface 104 that tower 102 is coupled to by either anchor bolts or a foundation mounting piece (neither shown). A nacelle 106 is coupled to tower 102, and a rotor 108 is coupled to nacelle 106. Rotor 108 has a rotatable hub 110 and a plurality of rotor blades 112 coupled to hub 110. In the exemplary embodiment, rotor 108 has three rotor blades 112. Alternatively, rotor 108 has any number of rotor blades 112 that enable wind turbine generator 100 to function as described herein. In the exemplary embodiment, tower 102 is fabricated from tubular steel extending between supporting surface 104 and nacelle 106. Alternatively, tower 102 is any tower that enables wind turbine 100 to function as described herein including, but not limited to, a lattice tower. Tower 102 is any suitable height that enables wind turbine 100 to function as described herein.

Rotor blades 112 are positioned about rotor hub 110 to facilitate rotating rotor 108, thereby transferring kinetic energy from wind 124 into usable mechanical energy, and subsequently, electrical energy. Rotor 108 and nacelle 106 are rotated about tower 102 on a yaw axis 116 to control the perspective of rotor blades 112 with respect to the direction of wind 124. Rotor blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in rotor blades 112 are transferred to hub 110 via load transfer regions 122. Each of rotor blades 112 also includes a blade tip portion 125.

In the exemplary embodiment, rotor blades 112 have a length range of between 30 meters (m) (98 feet (ft)) and 200 m (656 ft), however these parameters form no limitations to the instant disclosure. Alternatively, rotor blades 112 may have any length that enables wind turbine generator to function as described herein. As wind 124 strikes each rotor blade 112, blade lift forces (not shown) are induced on each rotor blade 112 and rotation of rotor 108 about a rotation axis 114 is induced as blade tip portions 125 are accelerated.

A pitch angle (not shown) of rotor blades 112, i.e., an angle that determines perspective of each rotor blade 112 with respect to a direction of wind 124, may be changed by a pitch adjustment mechanism (not shown in FIG. 1). Specifically, increasing a pitch angle of rotor blade 112 decreases a blade surface area 126 exposed to wind 124 and, conversely, decreasing a pitch angle of rotor blade 112 increases blade surface area 126 exposed to wind 124. The pitch angles of rotor blades 112 are adjusted about a pitch axis 118 for each rotor blade 112. In the exemplary embodiment, the pitch angles of rotor blades 112 are controlled individually. Alternatively, the pitch of rotor blades 112 may be controlled as a group.

Figure 4:
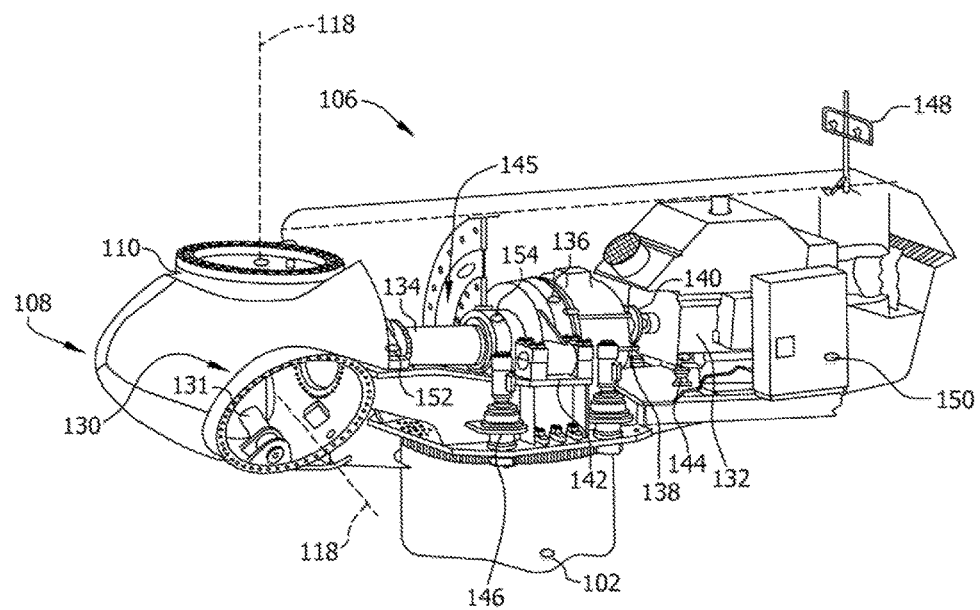
FIG. 4 is a cross-sectional schematic view of a nacelle that may be used with the wind turbine generator shown in FIG. 3.

FIG. 4 is a cross-sectional schematic view of nacelle 106 of exemplary wind turbine 100 (shown in FIG. 3). Various components of wind turbine 100 are housed in nacelle 106 atop tower 102 of wind turbine 100. Nacelle 106 includes one pitch drive mechanism 130 that is coupled to one rotor blade 112 (shown in FIG. 3), wherein pitch drive mechanism 130 modulates the pitch of associated rotor blade 112 along pitch axis 118. Only one of three pitch drive mechanisms 130 is shown in FIG. 4. In the exemplary embodiment, each pitch drive mechanism 130 includes at least one pitch drive motor 131. Pitch drive motor 131 is any electric motor driven by electrical power that enables pitch drive mechanism 130 to function as described herein. Alternatively, pitch drive mechanism 130 includes any suitable structure, configuration, arrangement, and/or components such as, but not limited to, hydraulic cylinders, springs, and/or servomechanisms. Moreover, pitch drive mechanisms 130 may be driven by any suitable means such as, but not limited to, hydraulic fluid, and/or mechanical power, such as, but not limited to, induced spring forces and/or electromagnetic forces.

Nacelle 106 also includes a rotor 108 that is rotatably coupled to an electric generator 132 positioned within nacelle 106 via rotor shaft 134 (sometimes referred to as either a main shaft or a low speed shaft), a gearbox with externally mounted sensor 136, a high speed shaft 138, and a coupling 140. Rotation of shaft 134 rotatably drives gearbox 136 that subsequently rotatably drives high speed shaft 138. High speed shaft 138 rotatably drives generator 132 via coupling 140 and rotation of high speed shaft 138 facilitates production of electrical power by generator 132. Gearbox 136 and generator 132 are supported by supports 142 and along with an embedded sensor 144, respectively. In the exemplary embodiment, gearbox 136 utilizes dual path geometry to drive high speed shaft 138. Alternatively, rotor shaft 134 is coupled directly to generator 132 via coupling 140.

Nacelle 106 further includes a yaw drive mechanism 146 that may be used to rotate nacelle 106 and rotor 108 on yaw axis 116 (shown in FIG. 1) to control the perspective of rotor blades 112 with respect to the direction of wind 124. Nacelle 106 also includes at least one meteorological and communications mast 148, wherein mast 148 includes a plurality of sensors. Mast 148 provides information to a turbine control system (not shown) that may include wind direction and/or wind speed. A portion of the turbine control system and sensor signal processor resides within a control cabinet 150. In the exemplary embodiment, nacelle 106 further includes main, or forward and aft support bearings and bearing sensors 152 and 154, respectively. Support bearings 152 and 154 facilitate radial support and alignment of rotor shaft 134. Forward support bearing and bearing sensor 152 is positioned on rotor shaft 134 near hub 110. Aft support bearing and bearing sensor 154 is positioned on rotor shaft 134 near gearbox and gear box sensors 136 and/or generator 132. Alternatively, nacelle 106 includes any number of support bearings that enable wind turbine 100 to function as disclosed herein.

Hub 110, rotor shaft 134, generator 132, gearbox 136, high speed shaft 138, coupling 140, and any associated fastening, support, and/or securing device including, but not limited to, supports 142 and sensor 144 and support bearings and bearing sensors 152 and 154, are referred to as a drive train 145.

Figure 5:
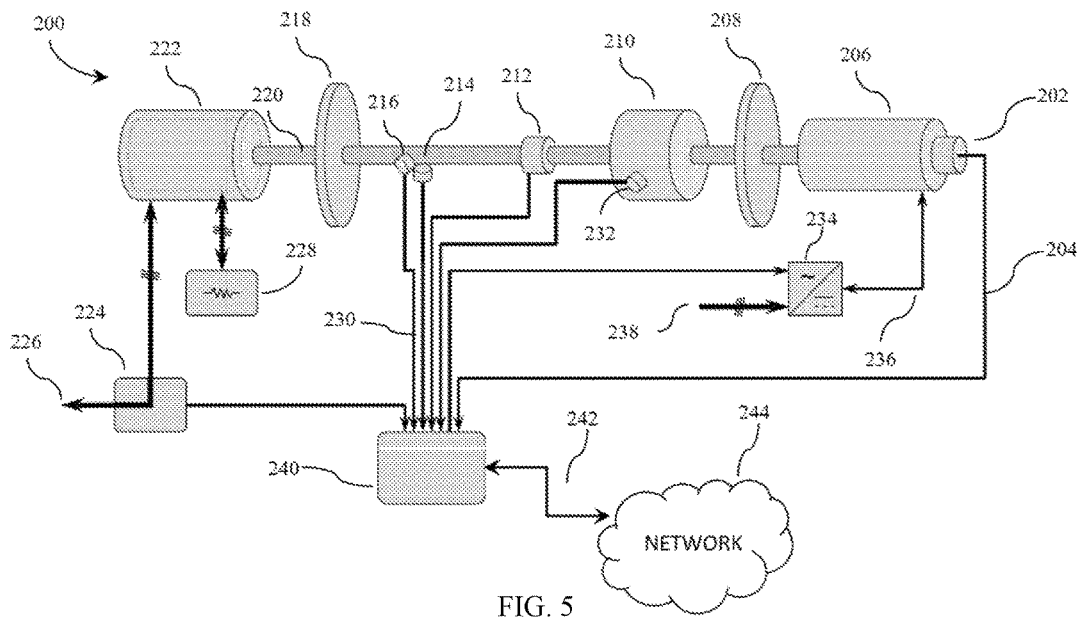
FIG. 5 is a schematic view of an exemplary condition monitoring system that may be used with the wind turbine generator shown in FIG. 3.

FIG. 5 is a schematic view of an exemplary wind turbine condition monitoring system 200 that may be used with wind turbine 100 (shown in FIG. 3). Wind turbine condition monitoring system 200 is the same in structure and operation as wind condition monitoring system 10 except as described below. In this example, wind turbine condition monitoring system 200 may include a plurality of optical sensors, e.g., a vibrational sensor, an accelerometer, a voltage sensor and a current sensor. In this example, sensors 202, 212 and 232 are vibrational sensor, sensors 214 and 216 are acceleration sensors, and sensor 224 is a current/voltage sensor, although other types and/or numbers optical sensors may be used in other locations as described above.

All active components of the system, such as the light source, detector, and any additional electronics, are connected to the sensors via optical cables 230 that house separate optical fibers (not shown) for connection of each of the exemplary sensors 202, 232, 212, 214, 216 and 224 to the light source and one or more detectors (not shown). Each of the sensors 202, 232, 212, 214, 216 and 224 are located separately at different locations of the wind turbine to measure different systems of the wind turbine generator. In this example, the mechanical system including hub 206, bearings 208, 218, gear box 210, and drive shaft 220, and the electrical systems including generator 222, power transfer cable 226 and resistive load 228, are monitored by the plurality of sensors.

Each of the sensors 202, 232, 212, 214, 216, and 224 are located remotely from the active electronics of the light source and detector, which are located within device 240. In one example, one or more sensors of the present invention may be embedded in the structure of the wind turbine generator to measure for vibration or otherwise monitor the condition of the wind turbine using the remotely located active components (i.e., light source, detector, and other electronics)

In one example, wind turbine condition monitoring system 200 may detect vibration of an object, or monitor the condition of an object, e.g., determine changes in the standard frequency of the object to identify potential failure states, or a change in environmental conditions surrounding the object. Wind turbine condition monitoring system 200 may also detect voltage and current of an object, or monitor the condition of an object, e.g., determine changes in the voltage and output of the wind turbine generators power output based on or a change in environmental wind conditions.

The active components of wind turbine condition monitoring system 200, which are stored in device 240, may be coupled to a computing device including a processor and a memory coupled to the processor so that the processor executes programmed instructions stored in the memory to determine, based on the measured intensity values, a change in light intensity is proportional to the said sensor measurement. Based on the optical intensity signals of each sensor, wind turbine condition monitoring system 200 sends a control signal to the wind turbine generator system control 234 to change the current operating state of the wind turbine generator. Wind turbine condition monitoring system 200 also connects to a network 244 via connection 242. Network 244 allows for external monitoring or control of the said wind turbine generator to change its current operating state.

A further aspect of the present invention relates to a method for monitoring a condition of a wind turbine. The method involves providing the wind turbine condition monitoring system according to the present invention. The plurality of optical sensors are coupled to the wind turbine. The intensity values are measured for the one or more product light beams for each of the plurality of optical sensors over a period of time. At least a displacement value, a current value, and a voltage value for the wind turbine generator or transformer therein are determined over the period of time based on the measured intensity values for the one or more product light beams for each of the plurality of optical sensors. The determined displacement value, the determined current value, and the determined voltage value are monitored for changes over the period of time to monitor the condition of the wind turbine generator or transformer therein.

Figure 6:
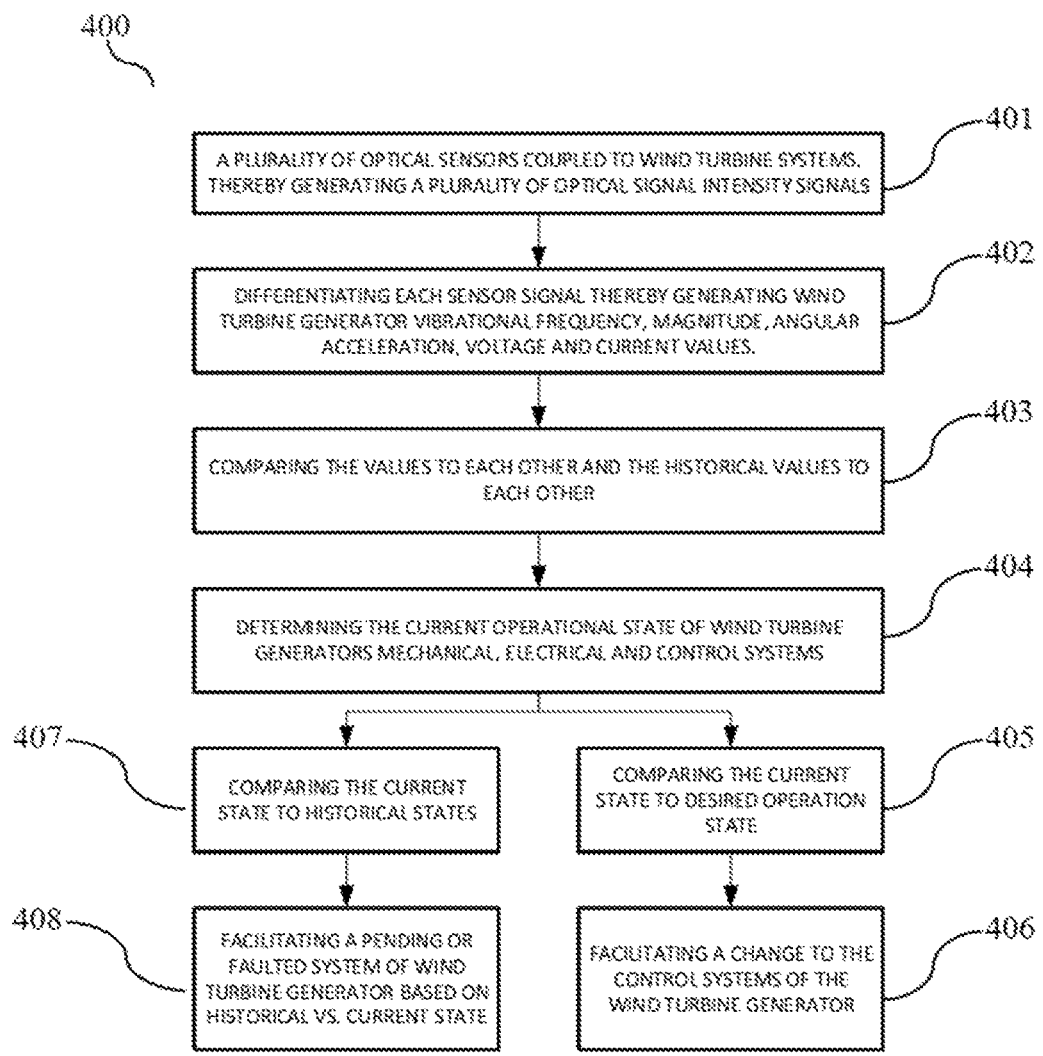
FIG. 6 is a flow chart of an exemplary method of operating the wind turbine generator shown in FIG. 3.

FIG. 6 is a flow chart of an exemplary method 400 for monitoring a condition of wind turbine 100 (shown in FIG. 3), by way of example. An exemplary operation of the wind turbine condition monitoring system of the present invention will now be described with respect to FIGS. 1-6. Method 400 includes in step 401, coupling plurality of sensors 14(1)-14(n) to the wind turbine. In one example, sensors 202, 232, 212, 214, 216 and 224 as shown in FIG. 5 are coupled to the mechanical systems, which include hub 206, bearings 208, 218, gear box 210, drive shaft 220, and electrical systems, which include generator 222, power transfer cable 226, and resistive load 228, of the wind turbine thereby generating a plurality of optical intensity signals during operation of the wind turbine 100, although other optical sensors may be utilized in other locations on wind turbine 100.

Referring again to FIG. 1, light source emits 12 emits a light beam that is directed toward plurality of optical sensors 14(1)-14(n). As described above, a collimator or other optics may be utilized to collimate the emitted light beam prior to interaction with plurality of optical sensors 14(1)-14(n). Other beam shaping optics may be utilized, such as filters or lenses, prior to plurality of optical sensors 14(1)-14(n). The light beam may be transmitted from light source 12 to plurality of optical sensors 14(1)-14(n) using optical fibers so that light source 12 is located remotely from plurality of optical sensors 14(1)-14(n). Plurality of optical sensors 14(1)-14(n) generate product light beams that are transmitted to detector 16.

Detector 16 receives the product light beams and is configured to measure intensity values of the product light beams, as described above. Detector 16 provides the measured intensity values to system monitoring computing device 18. According to one embodiment, an amplifier may be utilized provide increased signal strength from the detector 16. Other electronics, such as an analog to digital converter, may be used to provide other signal processing functions.

Figure 7A:
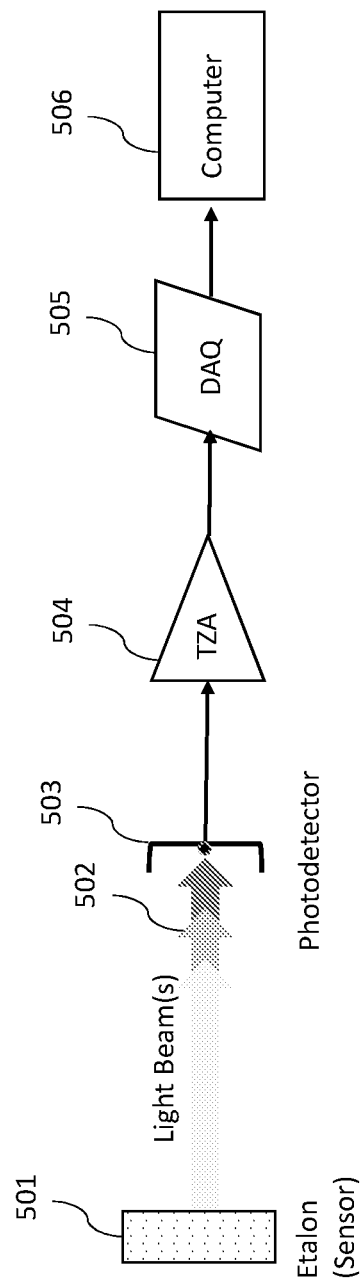
FIG. 7A shows schematic of an exemplary hardware implementation of an optical sensor utilizing an etalon for wind turbine condition monitoring.
Figure 7B:
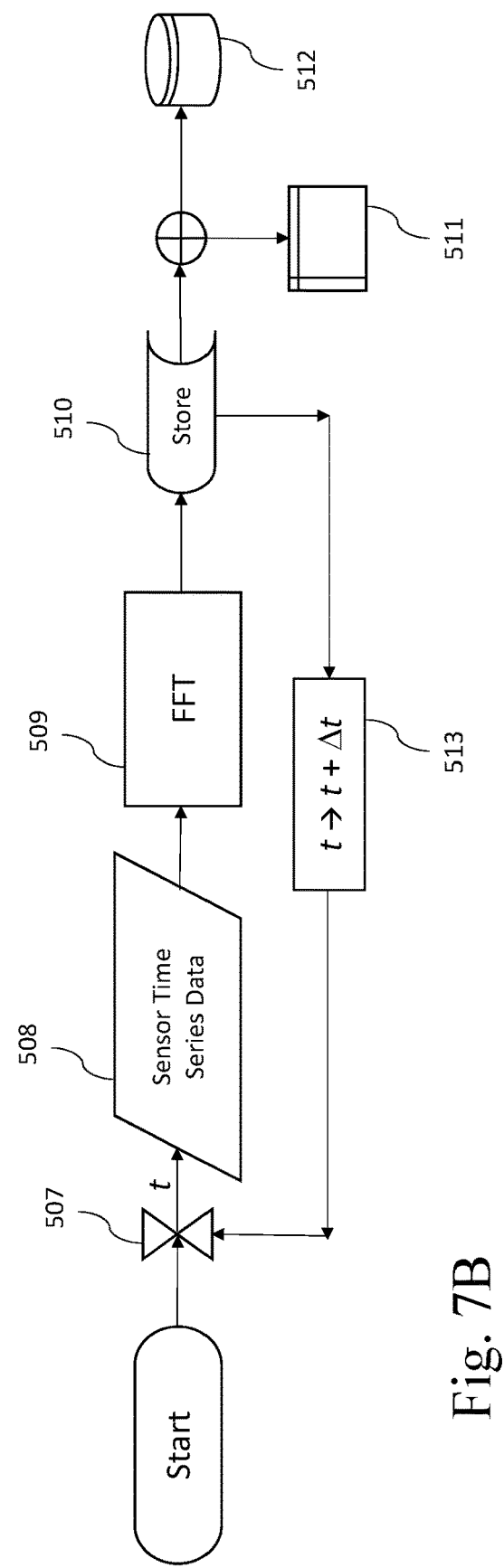
FIG. 7B shows a flowchart of the algorithm and software method utilized by the computer or computing device to be reduced to programming instructions.
Figure 8:
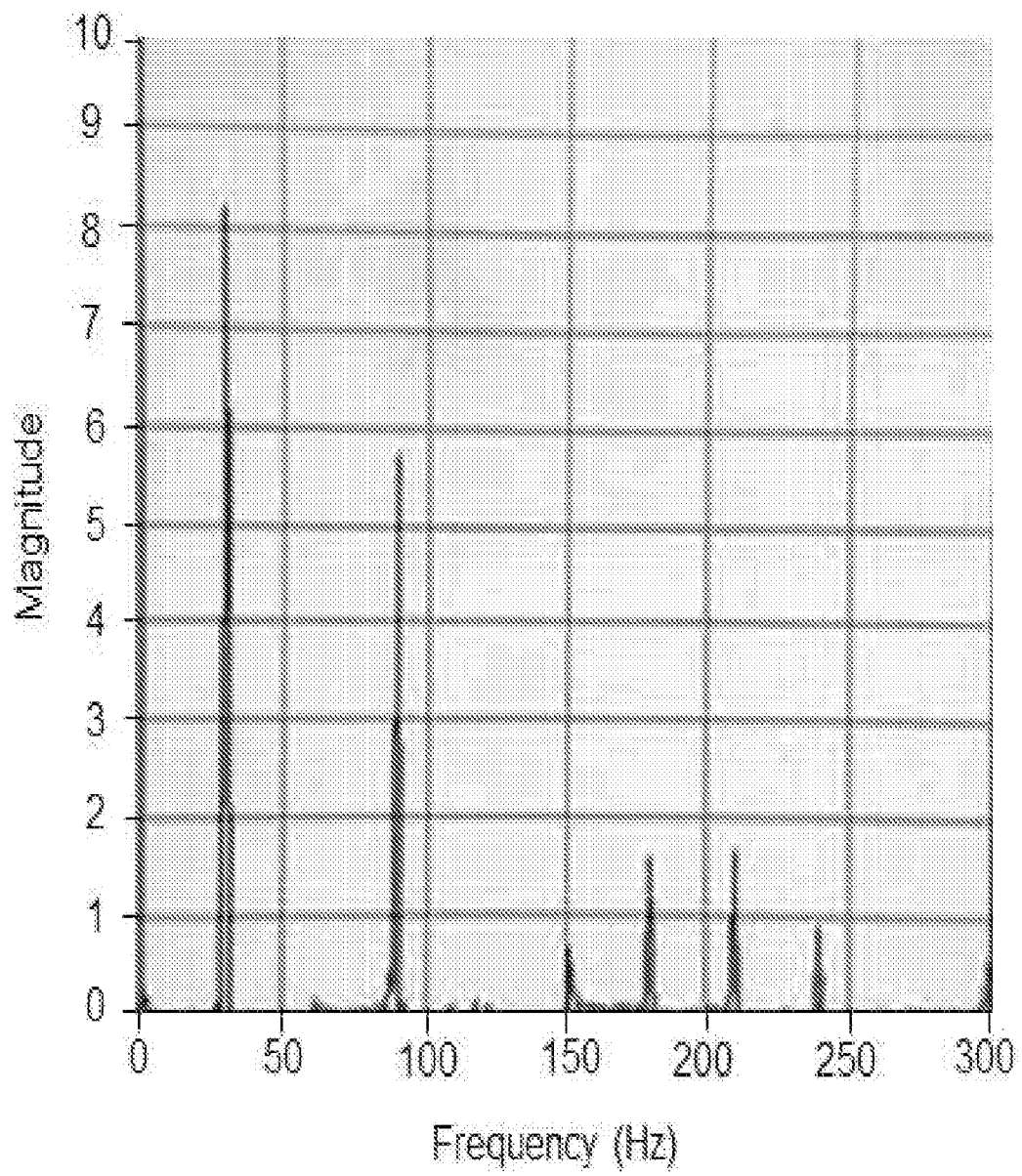
FIG. 8 shows and exemplary demonstration of the enhanced wind turbine condition monitoring system utilizing an etalon sensor for the primary vibration frequency of 30 Hz, equivalent to 1800 RPM of the wind turbine rotor shaft.

In one example, as illustrated in FIG. 7A an etalon sensor 501, as described in PCT Application PCT/US2015/15763, the disclosure of which is hereby incorporated herein by reference in its entirety, is utilized. The spatially overlapping and partially coherent light beams 502 generated by the etalon 501 are incident on the photodetector 503. The resulting modulated and periodic optical or photonic signal is converted to an opto-electronic signal that is amplified and potentially filtered by a Transimpedance Amplifier (TZA) 504, which is then sampled by a Data Acquisition (DAQ) system (505). The resulting sample signal data is then forwarded to the memory or data storage of a computer or computing device (506). As illustrated in FIG. 5B, an event timestamp 507 at clock time t is crated at the point etalon sensor data 508 is captured. The time series data is processed by a Fast Fourier Transform (FFT) algorithm or subroutine 509 which is then stored 510 either in memory or bus 511 of the computing device or data storage (disk) 512 of the computer. The clock timestamp is then incremented ($\Delta t$) 513, and the algorithm or method then iterates. FIG. 8 shows an exemplary demonstration of the enhanced wind turbine condition monitoring system utilizing an all-optical or photonic etalon sensor for the primary vibration frequency of 30 Hz, equivalent to 1800 revolutions per minute of the wind turbine rotor shaft. The primary 30 Hz frequency, and associated harmonics at 90 Hz, 150 Hz, 210 Hz, and 240 Hz, are clearly displayed with associated amplitude distributions.

Referring again to FIG. 6, next, in step 402, each optical signal intensity signal from plurality of optical sensors 14(1)-14(n) is differentiated, thereby generating a plurality of optical signal intensity values, which may include, by way of example, a displacement value, a voltage, and/or a current value, although other values may be obtained. In one example, the displacement value comprises an angular displacement value, which may be utilized to determine an angular velocity value or an angular acceleration value for the wind turbine 100 based on the determined displacement value over time. In another example, the determined displacement value may be utilized to determine a vibrational frequency of the wind turbine 100 based on the displacement value over time.

In step 403, the obtained values, such as displacement values, current values, and/or voltage values, by way of example, are compared to one another, while the historic values for these parameters are also compared for a prediction of future values or states of the operation of the wind turbine 100. Next, in step 404, a current operational state of the wind turbine 100 is determined based on the obtained values, including the mechanical, electrical, and control systems of the wind turbine 100.

In step 405, the current state of the wind turbine 100, based on the obtained values, such as a displacement value, current value, or voltage value, is compared to a desired state of operation, although other values such as angular velocity or angular acceleration may be compared. By way of example, a determined displacement value, current value, and voltage value may be comparted to standard operating values for these parameters. In one example, the monitoring system computing device 18 determines if the measured values differ from the corresponding standard values by more than a threshold amount. If so, the monitoring system computing device 18 identifies a potential failure state for the wind turbine 100. In step 406, the wind turbine monitoring system 200 provides one or more instructions to the operating system of the wind turbine 100 to facilitate a change in the control operation status of the wind turbine 100. By way of example the at least one control operation status may be the peak load, generator output, or an operating temperature.

In step 407, the current state is compared to one or more historical states. By way of example, present time values for displacement, current, and/or voltage may be compared to historical values, although other values may be compared to historical parameters. In step 408, the wind turbine monitoring system 200 may identify a pending fault or current fault state of the wind turbine 100 and identify one or more necessary operational changes of the wind turbine systems to facilitating a change to a desired state, as described above.

The above-described method and condition monitoring system described herein facilitate operation of wind turbine generators by measuring the current operational state of said wind turbine generator. Such conduction measurements provide indications of increased stresses on the wind turbine generator systems that may be reduced by changes in current operational state of the wind turbine generator, i.e. control surfaces, generator output and rotating components. Reducing such stresses facilitates extending operational life expectancies of wind turbine generators.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A wind turbine condition monitoring system comprising:
   a light source configured to produce an emitted light beam;
   a plurality of optical sensors configured to be positioned at a plurality of separate locations on a wind turbine and to receive the emitted light beam from the light source, wherein each of the plurality of optical sensors is configured to generate one or more product light beams from the emitted light beam, the plurality of optical sensors comprising at least one vibration sensor, at least one voltage sensor, and at least one current sensor;
   a detector positioned to receive the one or more product light beams generated from each of the plurality of optical sensors, the detector configured to measure intensity values of the one or more product light beams for each of the plurality of optical sensors; and
   a computing device coupled to the detector, the computing device comprising a processor and a memory coupled to the processor, wherein the processor executes programmed instructions stored in the memory to determine, based on the measured intensity values for the one or more product light beams for each of the plurality of optical sensors, at least a displacement value, a current value, and a voltage value for the wind turbine.

2. The system of claim 1, wherein the displacement value comprises an angular displacement and wherein the processor is further configured to execute at least one additional programmed instruction stored in the memory to determine an angular velocity value or an angular acceleration value for the wind turbine based on the determined displacement value over time.

3. The system of claim 1, wherein the processor is further configured to execute at least one additional programmed instruction stored in the memory to determine a vibrational frequency based on the displacement value over time.

4. The system of claim 1, wherein the processor is further configured to execute at least one additional programmed instruction stored in the memory to:
   compare each of the determined displacement value, the determined current value, and the determined voltage value for the wind turbine to a plurality of corresponding historical displacement values, current values, and voltage values for the wind turbine; and
   determine, based on the compared values, a potential failure state of the wind turbine.

5. The system of claim 1, wherein the processor is further configured to execute at least one additional programmed instruction stored in the memory to:
   compare each of the determined displacement value, the determined current value, and the determined voltage value for the wind turbine to corresponding standard operating displacement values, current values, and voltage values for the wind turbine;
   determine, based on the compared values, whether a difference between the determined values and the corresponding standard values exceeds a threshold value;

identify a potential failure state of the wind turbine when the difference between the determined values and the corresponding standard values exceeds the threshold value; and provide an instruction to the wind turbine to change at least one control system operation status based on the identified potential failure state, wherein the at least one control operation status comprises at least one of a peak load, a generator output, or an operating temperature.

6. The system of claim 1, wherein the at least one vibration sensor comprises an etalon positioned to receive the emitted light beam from the light source and configured to generate a plurality of product light beams from the emitted light beam, the etalon being mounted to a support structure at one or more pivot points, wherein the displacement value is determined based on a change in position of the etalon relative to the one or more pivot points, wherein the processor is further configured to execute at least one additional programmed instruction stored in the memory to determine an acceleration value based on the determined change in position of the etalon relative to the one or more pivot points.

7. The system of claim 6, wherein the etalon is configured to generate a plurality of spatially overlapping, partially coherent product light beams that provide a composite light beam having an optical power that is modulated or interfered to produce a periodic optical signal when the optical power is incident on the detector, wherein the processor is further configured to execute at least one additional programmed instruction stored in the memory to:

process the periodic optical signal to produce a Fourier transform of the periodic optical signal to identify primary frequencies, harmonics, overtones, and associated non-harmonic and aliased frequency artifacts in the periodic optical signal;

calculate frequency characteristics of the periodic optical signal as a function of time using the Fourier transform;

store the frequency characteristics along with a timestamp; and determine differences in the frequency characteristics as a function of time to determine a stage change of the wind turbine.

8. The system as set forth in claim 1, wherein the at least one vibration sensor is configured to detect vibrations due to magnetostriction within the wind turbine.

9. A method for monitoring a condition of a wind turbine, the method comprising:

providing the wind turbine condition monitoring system of claim 1;

coupling the plurality of optical sensors to the wind turbine;

measuring the intensity values for the one or more product light beams for each of the plurality of optical sensors over a period of time;

determining, based on the measured intensity values for the one or more product light beams for each of the plurality of optical sensors, at least a displacement value, a current value, and a voltage value for the wind turbine over the period of time;

monitoring the determined displacement value, the determined current value, and the determined voltage value for changes over the period of time to monitor the condition of the wind turbine.

10. The method of claim 9, wherein the displacement value comprises an angular displacement, the method further comprising:

determining an angular velocity value or an angular acceleration value for the wind turbine based on the determined displacement value over time; and monitoring the determined angular velocity value or the determined angular acceleration value for changes over the period of time to monitor the condition of the wind turbine.

11. The method of claim 9 further comprising:

determining a vibrational frequency based on the displacement value over time;

monitoring the determined vibrational frequency value or the determined for changes over the period of time to monitor the condition of the wind turbine.

12. The method of claim 9, wherein the monitoring further comprises:

comparing each of the determined displacement value, the determined current value, and the determined voltage value for the wind turbine to a plurality of corresponding historical displacement values, current values, and voltage values for the wind turbine; and determining, based on the compared values, a potential failure state of the wind turbine.

13. The method of claim 9, wherein the monitoring further comprises:

comparing each of the determined displacement value, the determined current value, and the determined voltage value for the wind turbine to corresponding standard operating displacement values, current values, and voltage values for the wind turbine;

determining, based on the compared values, whether a difference between the determined values and the corresponding standard values exceeds a threshold value;

identifying a potential failure state of the wind turbine when the difference between the determined values and the corresponding standard values exceeds the threshold value; and changing at least one control system operation status of the wind turbine based on the identified potential failure state, wherein the at least one control operation status comprises at least one of a peak load, a generator output, or an operating temperature.

14. The method of claim 13, wherein the at least one vibration sensor comprises an etalon positioned to receive the emitted light beam from the light source and configured to generate a plurality of product light beams from the emitted light beam, the etalon being mounted to a support structure at one or more pivot points, wherein the displacement value is determined based on a change in position of the etalon relative to the one or more pivot points, the method further comprising determining an acceleration value based on the determined change in position of the etalon relative to the one or more pivot points.

15. The method of claim 14, wherein the etalon is configured to generate a plurality of spatially overlapping, partially coherent product light beams that provide a composite light beam having an optical power that is modulated or interfered to produce a periodic optical signal when the optical power is incident on the detector.

16. The method of claim 15 further comprising:

processing the periodic optical signal to produce a Fourier transform of the periodic optical signal to identify primary frequencies, harmonics, overtones, and associated non-harmonic and aliased frequency artifacts in the periodic optical signal.

17. The method as set forth in claim 9, wherein the at least one voltage sensor and at least one current sensor are coupled to one or more electrical insulation bushings of the wind turbine.

18. The method as set forth in claim 9, wherein the system comprises a plurality of vibrational sensors located at least at a core of the wind turbine, on a case of the wind turbine, on one or more support frame members of the wind turbine, or on one or more windings of the wind turbine.

19. The method as set forth in claim 9, wherein the determined displacement value is at least partially due to magnetostriction within the wind turbine or partial discharge within the wind turbine.

20. A wind turbine comprising the wind turbine condition monitoring system of claim 1, wherein the plurality of optical sensors are positioned at a plurality of separate locations on the wind turbine.

21. The wind turbine of claim 20, wherein the displacement value comprises an angular displacement and wherein the processor is further configured to execute at least one additional programmed instruction stored in the memory to determine an angular velocity value or an angular acceleration value for the wind turbine based on the determined displacement value over time.

22. The wind turbine of claim 20, wherein the processor is further configured to execute at least one additional programmed instruction stored in the memory to determine a vibrational frequency based on the displacement value over time.

23. The wind turbine of claim 20, wherein the processor is further configured to execute at least one additional programmed instruction stored in the memory to:
compare each of the determined displacement value, the determined current value, and the determined voltage value for the wind turbine to a plurality of corresponding historical displacement values, current values, and voltage values for the wind turbine; and
determine, based on the compared values, a potential failure state of the wind turbine.

24. The wind turbine of claim 20, wherein the processor is further configured to execute at least one additional programmed instruction stored in the memory to:
compare each of the determined displacement value, the determined current value, and the determined voltage value for the wind turbine to corresponding standard operating displacement values, current values, and voltage values for the wind turbine;
determine, based on the compared values, whether a difference between the determined values and the corresponding standard values exceeds a threshold value;
identify a potential failure state of the wind turbine when the difference between the determined values and the corresponding standard values exceeds the threshold value; and
provide an instruction to the wind turbine to change at least one control system operation status based on the identified potential failure state, wherein the at least one control operation status comprises at least one of a peak load, a generator output, or an operating temperature.

25. The wind turbine of claim 20, wherein the at least one vibration sensor comprises an etalon positioned to receive the emitted light beam from the light source and configured to generate a plurality of product light beams from the emitted light beam, the etalon being mounted to a support structure at one or more pivot points, wherein the displacement value is determined based on a change in position of the etalon relative to the one or more pivot points, wherein the processor is further configured to execute at least one additional programmed instruction stored in the memory to determine an acceleration value based on the determined change in position of the etalon relative to the one or more pivot points.

26. The wind turbine of claim 25, wherein the etalon is configured to generate a plurality of spatially overlapping, partially coherent product light beams that provide a composite light beam having an optical power that is modulated or interfered to produce a periodic optical signal when the optical power is incident on the detector, wherein the processor is further configured to execute at least one additional programmed instruction stored in the memory to:
process the periodic optical signal to produce a Fourier transform of the periodic optical signal to identify primary frequencies, harmonics, overtones, and associated non-harmonic and aliased frequency artifacts in the periodic optical signal;
calculate frequency characteristics of the periodic optical signal as a function of time using the Fourier transform;
store the frequency characteristics along with a timestamp; and
determine differences in the frequency characteristics as a function of time to determine a stage change of the wind turbine.

27. The wind turbine of claim 20, wherein the at least one displacement, or acceleration, or vibration sensor is configured to detect vibrations due to magnetostriction within the wind turbine.

28. The wind turbine of claim 20, wherein a plurality of vibrational sensors are located at least at a core of the wind turbine, on a case of the wind turbine, on one or more support frame members of the wind turbine, or on one or more windings of the wind turbine.

29. The wind turbine of claim 20, wherein the at least one displacement, or acceleration, or vibration sensor is configured to detect vibrations due to bearing and/or shaft failure within the wind turbine.

* * * * *